United States Patent
Kadowaki

(10) Patent No.: US 7,542,191 B2
(45) Date of Patent: Jun. 2, 2009

(54) OPTICAL SCANNING DEVICE, PRINTING APPARATUS, AND METHOD FOR ADJUSTING OSCILLATION AMPLITUDE OF OSCILLATING MIRROR

(75) Inventor: Seijiro Kadowaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/109,763

(22) Filed: Apr. 25, 2008

(65) Prior Publication Data

US 2008/0273230 A1    Nov. 6, 2008

(30) Foreign Application Priority Data

Apr. 26, 2007    (JP) ............... 2007-117022

(51) Int. Cl.
*G02B 26/08*    (2006.01)
(52) U.S. Cl. ....................................... 359/214
(58) Field of Classification Search .......... 359/212–214
See application file for complete search history.

(56) References Cited

U.S. PATENT DOCUMENTS

| | | | |
|---|---|---|---|
| 4,414,571 A * | 11/1983 | Kureha et al. ............... | 348/554 |
| 5,446,556 A | 8/1995 | Kuroiwa et al. | |
| 5,668,644 A | 9/1997 | Kuroiwa et al. | |
| 6,587,245 B2 * | 7/2003 | Hayashi ....................... | 359/204 |

FOREIGN PATENT DOCUMENTS

| | | |
|---|---|---|
| JP | 52-150642 | 12/1977 |
| JP | 05-127109 | 5/1993 |
| JP | 2005-173159 | 6/2005 |
| JP | 2006-220745 | 8/2006 |
| JP | 2006-320963 | 11/2006 |
| JP | 2007-086626 | 4/2007 |
| JP | 2007-245246 | 9/2007 |

OTHER PUBLICATIONS

Japanese Office Action, Reference No. P17015BAE, Mailing No. 772207, Mailing Date Dec. 16, 2008.

* cited by examiner

*Primary Examiner*—Euncha P Cherry
(74) *Attorney, Agent, or Firm*—Banner & Witcoff, Ltd

(57) ABSTRACT

An optical scanning device is provided. The optical scanning device includes an oscillating mirror which has a pair of electrodes and a mirror oscillator, and which deflects a light beam; a driving unit which applies a wave-like driving signal to the pair of electrodes so as to oscillate the mirror oscillator by an electrostatic force corresponding to the driving signal; and an adjusting unit which changes a duty ratio of the driving signal to adjust an oscillation amplitude of the oscillating mirror.

9 Claims, 9 Drawing Sheets

OPTICAL SCANNING DEVICE, PRINTING APPARATUS, AND METHOD FOR ADJUSTING OSCILLATION AMPLITUDE OF OSCILLATING MIRROR

CROSS-REFERENCE TO RELATED APPLICATION

This application claims priority from Japanese Patent Application No. 2007-117022, filed on Apr. 26, 2007, the entire subject matter of which is incorporated herein by reference.

TECHNICAL FIELD

Aspects of the present invention relate to an optical scanning device, a printing apparatus, and a method for adjusting an oscillation amplitude of an oscillating mirror.

BACKGROUND

Optical scanning devices which are disposed in a laser printer and the like use a polygon mirror rotated by a motor, or an oscillating mirror (resonance mirror) as described in JP-A-5-127109. For example, an oscillating mirror includes a mirror oscillator coupled to a frame portion through a support shaft portion (torsion beam). A movable electrode is disposed on the mirror oscillator, and a stationary electrode is disposed on the frame portion. An optical scanning device using the oscillating mirror comprises a driving circuit which applies a wave-like driving signal (for example, a sinusoidal signal) to the movable electrode or the stationary electrode. Accordingly, the mirror oscillator is caused to oscillate by an electrostatic force which is periodically produced between the movable electrode and the stationary electrode, and a restoring force of the support shaft portion which is elastically deformed by the electrostatic force. When a laser beam is applied from a light source on the oscillating mirror oscillator, the laser beam reflected by the oscillating mirror is periodically scanned over a photosensitive member.

Regarding the oscillating mirror, even if a driving signal of the same level is given from the driving circuit to the electrodes, an oscillation amplitude (oscillation angle range) of the oscillating mirror fluctuates when the ambient temperature or the like is varied. When the oscillation amplitude of the oscillating mirror fluctuates, the scan width of the laser beam on the photosensitive member is changed. Therefore, the optical scanning device described in JP-A-5-127109 includes an optical sensor which receives the laser beam reflected from the oscillating mirror. Then, the oscillation amplitude of the oscillating mirror is adjusted so as to be maintained constant by a feedback control in which a detection time difference of the laser beam by the optical sensor is compared with a predetermined reference time.

SUMMARY

In the optical scanning device described in JP-A-5-127109, as a method for adjusting the oscillation amplitude of the oscillating mirror, an amplification factor of an amplifier circuit for amplifying the driving signal is changed. In order to change the amplification factor of the amplifier circuit, a resistance of a feedback resistor or the like has to be changed. However, it is very difficult to change the resistance or the like finely. Consequently, there is a problem in that the driving signal cannot be finely adjusted and hence the oscillation amplitude of the oscillating mirror cannot be finely adjusted.

The driving frequency of the operation of oscillating the oscillating mirror is determined in accordance with a preset value of the scanning speed of the laser beam on the photosensitive member. If the driving frequency is set in the vicinity of the resonance frequency of the oscillating mirror in order to utilize a resonance phenomenon, the oscillation amplitude of the oscillating mirror largely fluctuates even when the level of the driving signal applied to the electrodes of the oscillating mirror is slightly changed. It is therefore particularly requested to finely adjust the driving signal.

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an optical scanning device and a printing apparatus including an oscillating mirror, an oscillation amplitude of which can be finely adjusted, and a method for finely adjusting the oscillation amplitude of the oscillating mirror.

According to an exemplary embodiment of the present invention, there is provided an optical scanning device comprising: an oscillating mirror which has a pair of electrodes and a mirror oscillator, and which deflects a light beam; a driving unit which applies a wave-like driving signal to the pair of electrodes so as to oscillate the mirror oscillator by an electrostatic force corresponding to the driving signal; and an adjusting unit which changes a duty ratio of the driving signal to adjust an oscillation amplitude of the oscillating mirror.

According to another exemplary embodiment of the present invention, there is provided a printing apparatus comprising: an optical scanning device and a printing unit. The optical scanning device includes: an oscillating mirror which has a pair of electrodes and a mirror oscillator, and which deflects a light beam; a driving unit which applies a wave-like driving signal to the pair of electrodes so as to oscillate the mirror oscillator by an electrostatic force corresponding to the driving signal; and an adjusting unit which changes a duty ratio of the driving signal to adjust an oscillation amplitude of the oscillating mirror. The printing unit includes a photosensitive member to be irradiated with light beam deflected by the optical scanning device, the printing unit configured to perform a printing process of transferring an image formed on the photosensitive member to a recording medium.

According to a further exemplary embodiment of the present invention, there is provided a method for adjusting an oscillation amplitude of an oscillating mirror which includes a pair of electrodes and a mirror oscillator, and which deflects a light beam, the method comprising: adjusting the amplitude of the oscillating mirror by changing a duty ratio of a driving signal which is applied to the pair of electrodes of the oscillating mirror.

The above configuration in which the oscillation amplitude of the oscillating mirror is adjusted by changing the duty ratio of the driving signal which is applied to the electrodes of the oscillating mirror is provided. Therefore, the oscillation amplitude of the oscillating mirror can be more finely adjusted as compared with the case where the amplitude of an oscillating mirror is adjusted by using the amplification factor.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

An exemplary embodiment of the present invention will be described with reference to FIGS. 1 to 9. The exemplary embodiment will be described in relation to a laser printer. However, the inventive concept of the present invention also applies to other apparatuses.

(Overall Configuration of Laser Printer)

Figure 1:
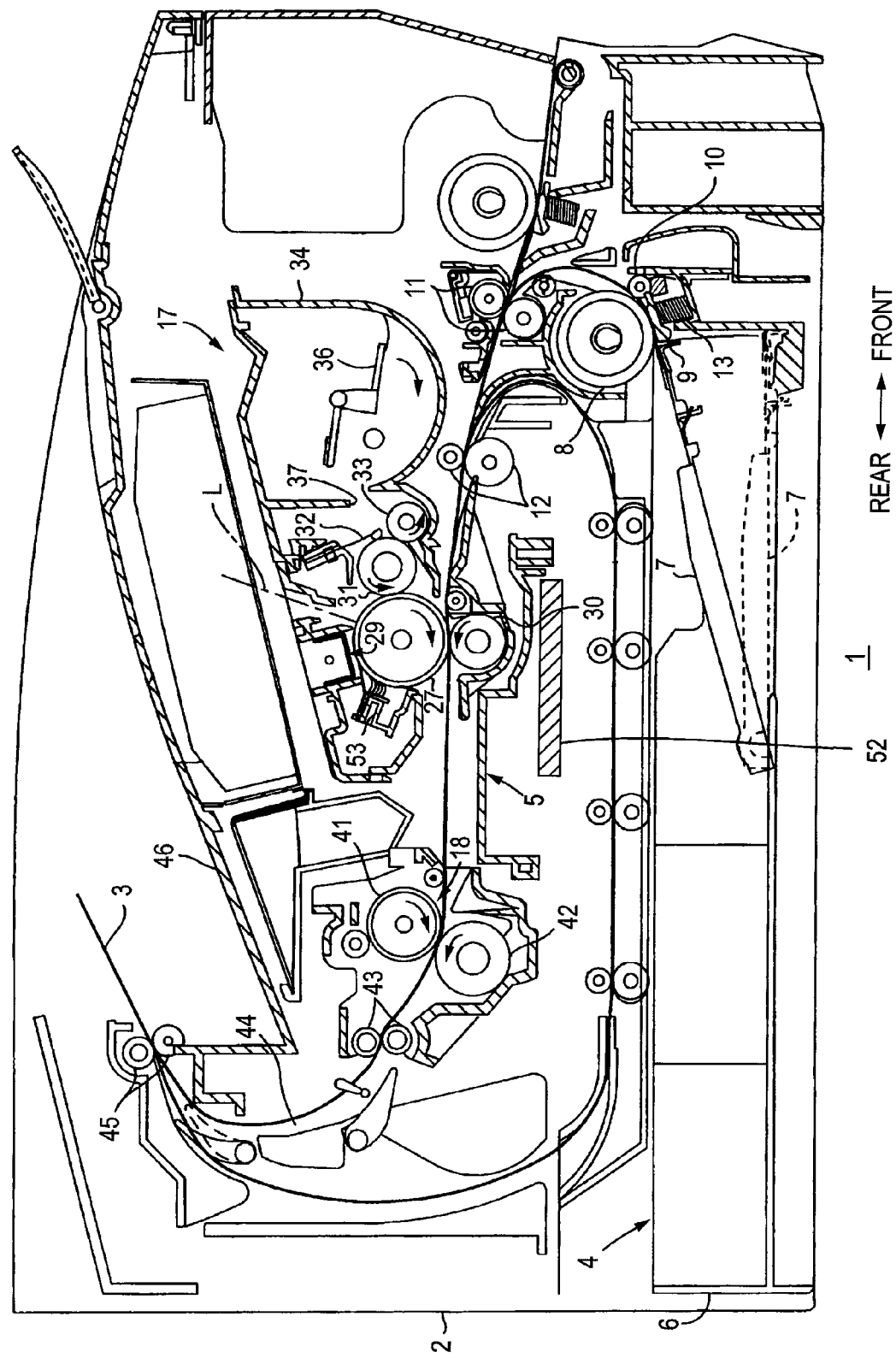
FIG. 1 is a side sectional view of a laser printer according to an exemplary embodiment of the present invention.

FIG. 1 is a side sectional view of a laser printer 1. The laser printer 1 (printing apparatus) includes a feeder unit 4 which feeds a sheet 3 (recording medium), and a printing unit 5 which forms an image on the sheet 3 fed by the feeder unit 4, in a body frame 2.

(1) Feeder Unit

The feeder unit 4 includes a sheet feeding tray 6, a sheet pressing plate 7, a feed roller 8, a separation pad 9, paper dust removing rollers 10, 11, and a registration roller 12. The separation pad 9 is pressed against the feed roller 8 by a spring 13. Hereinafter, the description will be made assuming that the right side of the sheet in FIG. 1 is the front side of the laser printer 1, and the left side of the sheet in FIG. 1 is the rear side of the laser printer 1.

The sheet pressing plate 7 is swingable about a rear end portion thereof, and a front end side is upwardly urged by a spring (not shown). Therefore, the uppermost sheet 3 among the sheets 3 placed on the sheet pressing plate 7 is pressed toward the feed roller 8. The sheets 3 on the sheet pressing plate 7 is nipped by the feed roller 8 and the separation pad 9 along the rotation of the feed roller 8, and then fed one by one.

The fed sheet 3 is subjected to paper dust removal by the paper dust removing rollers 10, 11, and then sent to the registration roller 12. Thereafter, the registration roller 12 sends the sheet 3 to a transferring position. In the transferring position, a toner image on a photosensitive drum 27 is transferred to the sheet 3, and the photosensitive drum 27 (photosensitive member) contacts a transfer roller 30 (transferring unit).

(2) Printing Unit

The printing unit 5 includes a scanner unit 16, a process cartridge 17, and a fixing unit 18.

Figure 2:
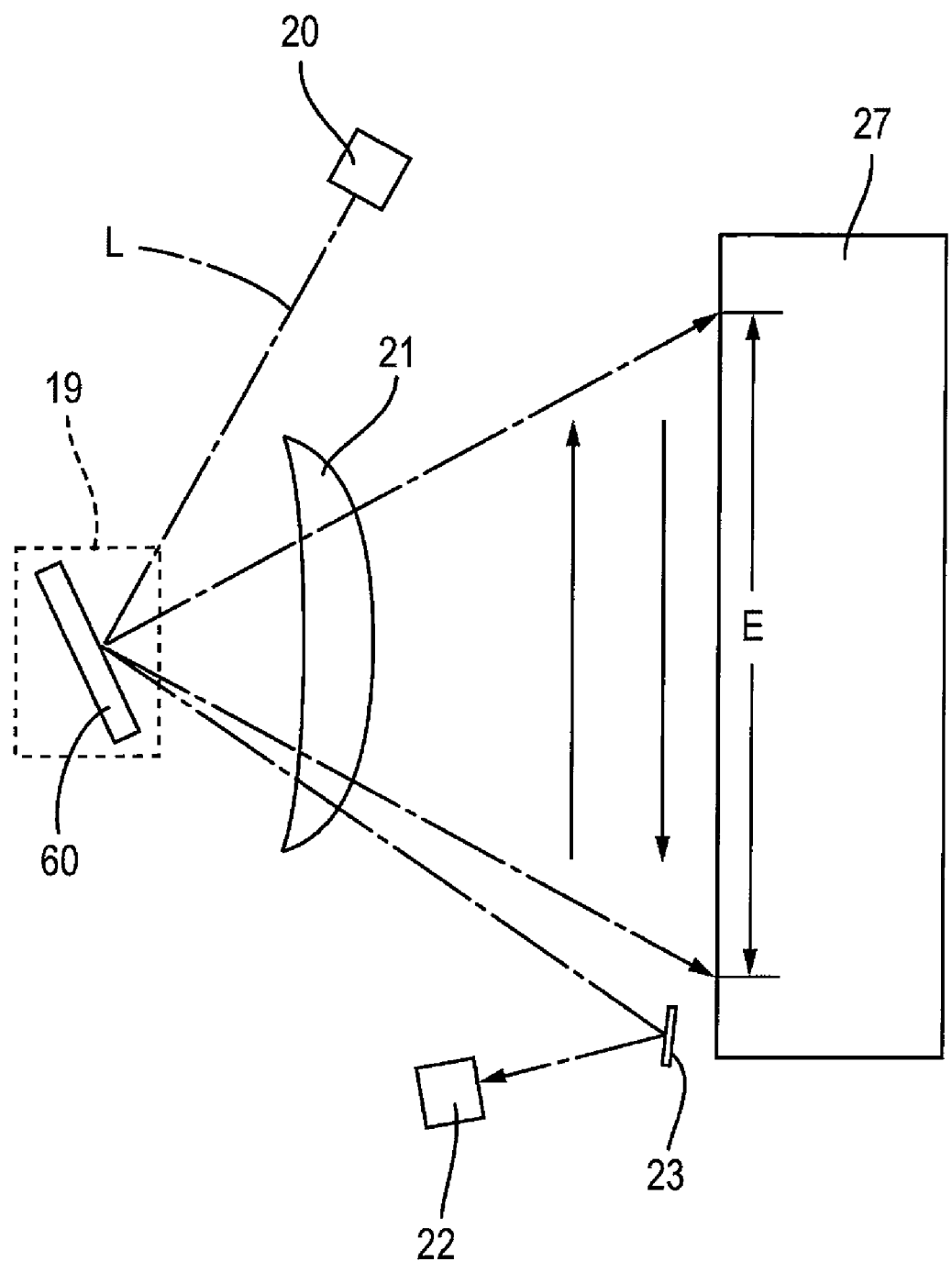
FIG. 2 is a diagram showing a configuration of a scanner unit according to an exemplary embodiment of the present invention.

FIG. 2 is a diagram showing the configuration of the scanner unit 16 (optical scanning device). A semiconductor laser 20 performs on-off operations on the basis of an image signal. A laser beam (light beam) L emitted from the semiconductor laser 20 is deflected by an oscillating mirror 19 as indicated by a chain line. The laser beam L which is deflected by the mirror passes through an optical system 21, for example, including a scanning lens or a cylindrical lens to be imaged on the surface of the photosensitive drum 27, thereby forming an electrostatic latent image in a printing region E on the surface of the photosensitive drum 27. A BD sensor 22 is disposed in the scanner unit 16. The BD sensor 22 (optical sensor) detects the laser beam L that has passed through the optical system 21 at a predetermined position. Specifically, the scanner unit 16 is configured so that the laser beam L that has passed through the optical system 21 incidents on the BD sensor 22 through a reflecting mirror 23.

The detection timing of the laser beam L in the BD sensor 22 is used for measuring the timing of starting illumination of the laser beam L on the printing region E. The time interval of the detection timing (hereinafter, such interval is referred to as "detection time interval") is used for detecting the oscillation amplitude W of the oscillating mirror 19 as described later. The oscillating mirror 19 will be described in detail later.

The process cartridge 17 includes a developing roller 31, a layer-thickness restricting blade 32, a supplying roller 33, and a toner hopper 34. A toner in the toner hopper 34 is stirred by an agitator 36, and then discharged from a toner supply port 37. During a developing process, a developing bias voltage is applied to the developing roller 31 by a bias applying circuit (not shown).

The toner discharged through the toner supply port 37 is supplied to the developing roller 31 by rotation of the supplying roller 33, and frictionally positively charged between the supplying roller 33 and the developing roller 31. The toner supplied onto the developing roller 31 is carried in the form of a thin layer on the developing roller 31 with the layer-thickness restricting blade 32.

The process cartridge 17 further includes the photosensitive drum 27, a scorotron charging device 29, the transfer roller 30, and a cleaning brush 53. The surface of the photosensitive drum 27 is positively charged by the charging device 29, and then exposed by the laser beam L emitted from the scanner unit 16, thereby forming an electrostatic latent image.

Next, the toner carried on the surface of the developing roller 31 is supplied to the electrostatic latent image formed on the photosensitive drum 27 to develop the image. During a transferring process, a transferring bias voltage is applied to the transfer roller 30 by a bias applying circuit (not shown). A cleaning bias voltage is applied to the cleaning brush 53, whereby paper powder adhering to the photosensitive drum 27 is electrically attracted to the cleaning brush 53 and removed from the photosensitive drum 27.

During a period when the sheet 3 is passed between a heating roller 41 and a pressing roller 42, the fixing unit 18 thermally fixes the toner on the sheet 3. Thereafter, the sheet is conveyed to a discharging path 44 by a conveying roller 43. The sheet 3 which is sent to the discharging path 44 is discharged to a sheet discharging tray 46 by a discharge roller 45.

(Oscillating Mirror)

Figure 3:
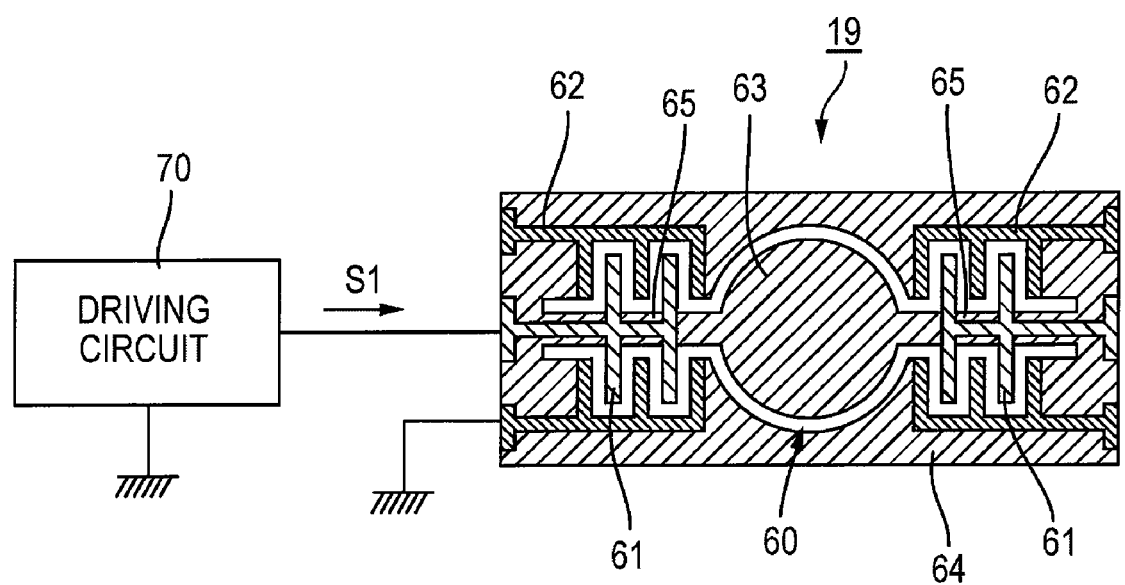
FIG. 3 is an overall view of an oscillating mirror according to an exemplary embodiment of the present invention.

FIG. 3 is an overall view of the oscillating mirror 19. The oscillating mirror 19 includes a mirror oscillator 60, and a pair of electrodes including a movable electrode 61 and a stationary electrode 62. The mirror oscillator 60 has a structure in which a circular mirror portion 63 is placed in a frame portion 64, and a pair of support shaft portions 65 extending in an opposite direction from the mirror portion 63 are coupled to the frame portion 64. The mirror oscillator 60 is formed by, for example, applying a process based on the micromachining technique such as etching and film formation on a single semiconductor substrate (e.g., a silicon wafer).

The movable electrode 61 which has a comb-like shape is disposed on each of the support shaft portions 65. The movable electrode 61 is formed by vapor-depositing a conductive material onto the support shaft portions 65. By contrast, the stationary electrode 62 which has a comb-like shape is disposed on the frame portion 64. The stationary electrode 62 is formed by vapor-depositing a conductive material onto the frame portion 64. Comb edges of the movable electrode 61 and the stationary electrode 62 are alternately placed so as to interdigitate while forming predetermined gaps therebetween.

A driving circuit 70 (driving unit) gives a pulse-like or wave-like driving signal S1 (voltage signal) between the movable electrode 61 and the stationary electrode 62. The driving signal has a rectangular waveform. Specifically, the driving signal S1 is given to the movable electrode 61, and the stationary electrode 62 is grounded. According to this configuration, the mirror portion 63 of the oscillating mirror 19 oscillates by an electrostatic force (an attractive force or a repulsive force) which is periodically produced between the movable electrode 61 and the stationary electrode 62, and a restoring force of the support shaft portion 65 which is torsionally deformed by the electrostatic force.

In the following description, it is assumed that a position where the mirror portion 63 is flush with the frame portion 64 is a natural position. In other words, the position of the mirror portion 63 when the support shaft portion 65 is in a natural state. And, an oscillation angle in the case where the mirror portion 63 is rotated from the natural position in one rotation direction is a positive angle, and the oscillation amplitude W of the mirror portion 63 at this time is positive. Additionally, an oscillation angle in the case where the mirror portion is rotated from the natural position in the other rotation direction (the direction opposite to the one direction) is a negative angle. The oscillation amplitude W of the mirror portion 63 at this time is assumed to be negative.

Figure 4:
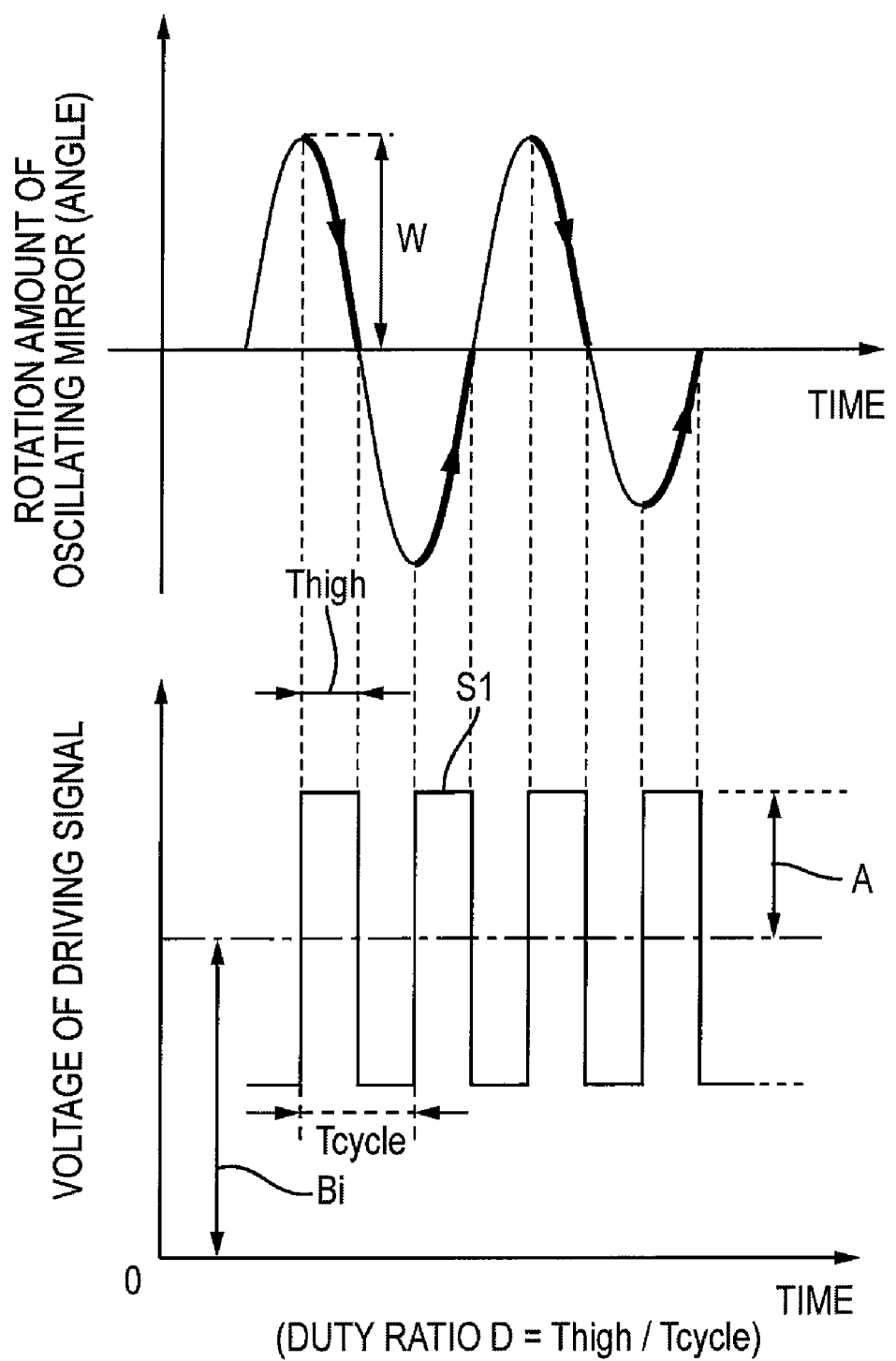
FIG. 4 is a view showing a relationship between an oscillation amplitude of a mirror portion and a waveform of a driving signal.

FIG. 4 is a view illustrating a relationship between the oscillation amplitude W of the mirror portion 63 and the waveform of the driving signal S1. The driving signal S1 has a rectangular waveform which has a high level by a time $T_{high}$ and a low level by a time $T_{low}$ with a frequency f. The high level is obtained by adding an amplitude A to a bias voltage Bi and the low level is obtained by subtracting the amplitude A from the bias voltage Bi. When the oscillation angle of the mirror portion 63 is a certain positive angle (a positive amplitude), for example, the mirror portion 63 is inwardly moved toward the natural position by the restoring force of the support shaft portion 65 which is torsionally deformed. At this time, when the driving signal S1 of a high level is given to the movable electrode 61, an energy is added by an electrostatic force (attractive force) to the inward movement of the mirror portion 63, so that the mirror portion 63 exceeds the natural position to be outwardly moved and the oscillation angle becomes negative. It is noted that the oscillation amplitude W of the oscillating mirror 19 denotes the oscillation amplitude W of the mirror portion 63 as explained above.

When the oscillation angle of the mirror portion 63 is a certain negative angle (a negative amplitude), the mirror portion 63 is inwardly moved toward the natural position by the restoring force of the support shaft portion 65 which is torsionally deformed. At this time, when the driving signal S1 of a high level is given to the movable electrode 61, an energy is added by an electrostatic force (attractive force) to the inward movement of the mirror portion 63. In this way, the mirror portion 63 continues to oscillate in accordance with the frequency of the driving signal S1 (hereinafter, the frequency is referred to as "driving frequency f"), the duty ratio D, the signal amplitude A, and the bias voltage Bi. It is noted that the duty ratio D denotes a ratio of the time of high level $T_{high}$ to a time of one cycle $T_{cycle}$ of the driving signal including the time of high level $T_{high}$ and the time of low level $T_{low}$. That is, the duty ratio D is defined by the expression: $D=T_{high}/T_{cycle}$.

(Driving Circuit)

Figure 5:
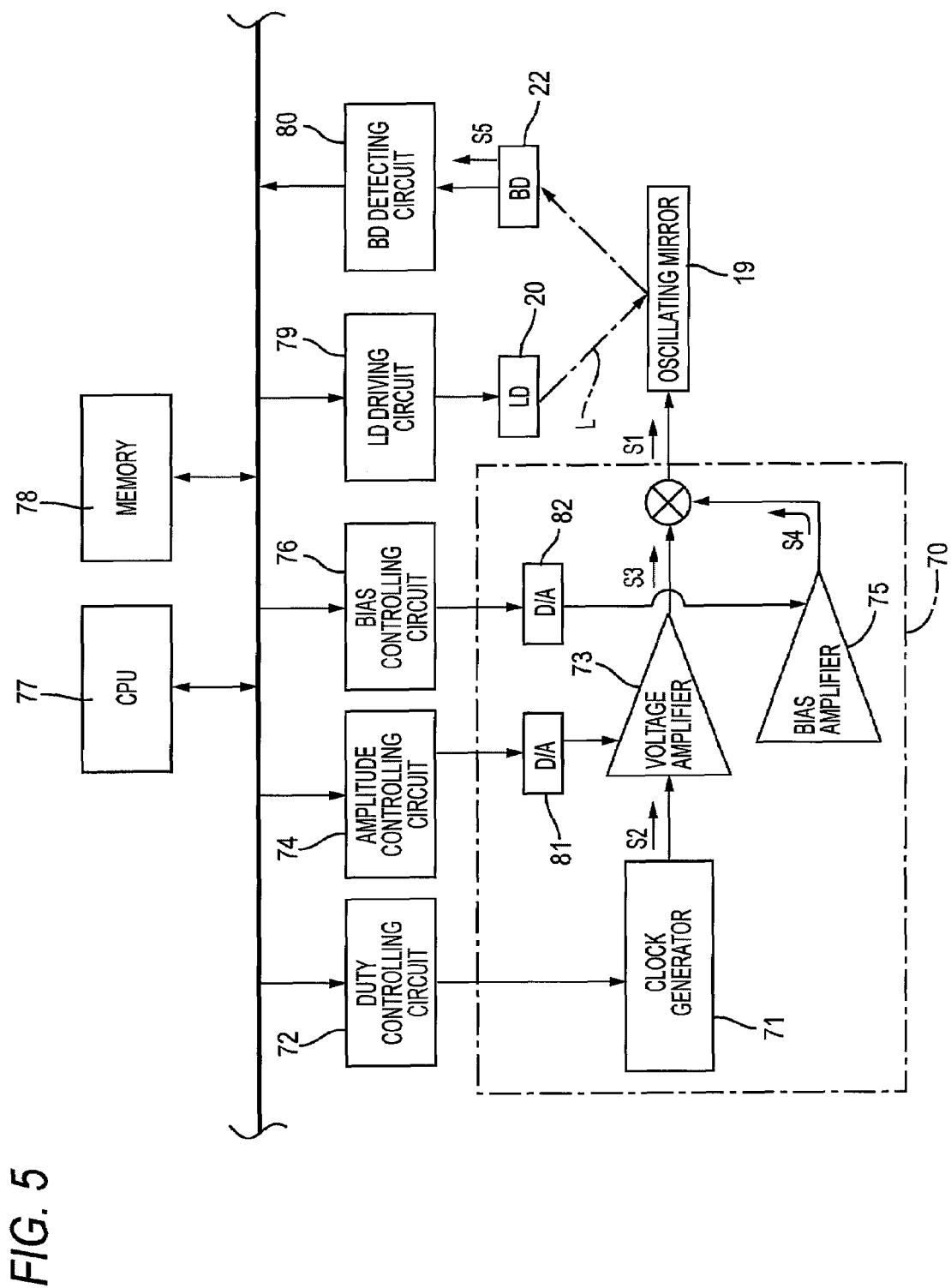
FIG. 5 is a block diagram showing a portion relating a control of the oscillating mirror according to an exemplary embodiment of the present invention.

FIG. 5 is a block diagram showing a portion relating to a control of the oscillating mirror 19. The driving circuit 70 includes a clock generator 71, a voltage amplifier 73, and a bias amplifier 75. The clock generator 71 is configured by, for example, a digital circuit so that the duty ratio D of a clock signal S2 (for example, 0 to 5 V) output from the circuit can be changed by a duty controlling circuit 72.

The voltage amplifier 73 amplifies the voltage of the clock signal S2. The voltage amplifier 73 is configured so that the amplification factor can be changed by an amplitude controlling circuit 74 through a D/A converter 81. The bias amplifier 75 is configured so that the amplification factor can be changed by a bias controlling circuit 76 through a D/A converter 82. The driving signal S1 (for example, 100 to 200 V) is a signal which is obtained by adding an output signal S3 of the voltage amplifier 73 with an output signal S4 of the bias amplifier 75.

The duty controlling circuit 72, the amplitude controlling circuit 74, the bias controlling circuit 76, a CPU 77 which controls these circuits, and a memory 78 are mounted on a control board (not shown) in the laser printer 1. An LD driving circuit 79 which controls an operation of the semiconductor laser 20, and a BD detecting circuit 80 which receives a light receiving signal S5 from the BD sensor 22 are mounted on the control board. Also these circuits are controlled by the CPU 77 and an output of a detection state is input to the CPU 77.

(Control of Oscillating Mirror)

Even when the driving signal S1 of the same level is given from the driving circuit 70 to the movable electrode 61, for example, the oscillation amplitude W (oscillation angle range) of the oscillating mirror 19 may fluctuate. The reason of this is as follows. The scanning speed of the laser beam is determined according to the target performance of the laser printer 1, and, in accordance with this, the driving frequency of the oscillating mirror 19 is determined. The mirror oscillator 60 is produced so that the driving frequency corresponds to the resonance frequency of the oscillating mirror. Due to production variations, the resonance frequencies of oscillating mirrors 19 may be different from one another. Additionally, when the ambient temperature is changed, the resonance frequency fluctuates. Therefore, the oscillation amplitude W of the oscillating mirror 19 may fluctuate. When the oscillation amplitude W of the oscillating mirror 19 fluctuates, the scan width (scan range) of the laser beam L on the photosensitive member 27 is changed. Therefore, the CPU 77 adjusts the oscillation amplitude W of the oscillating mirror 19 so as to be maintained constant, by means of a feedback control in which the detection time interval of the laser beam L in the BD sensor 22 is compared with a given reference time, which is the detection time interval in the case where the oscillation amplitude W of the oscillating mirror 19 coincides with the target value.

Factors for adjusting the oscillation amplitude W of the oscillating mirror 19 are as follows:

a. the duty ratio D of the driving signal S1 (the duty ratio of the clock signal S2);

b. the bias voltage Bi of the driving signal S1 (the voltage level of the output signal S4 of the bias amplifier 75);

c. the amplitude A of the driving signal S1 (the amplitude of the output signal S3 of the voltage amplifier 73); and d. the driving frequency f of the driving signal S1 (the frequency of the clock signal S2).

In the factors, it is not advantageous to change the driving frequency f of the driving signal S1, since, if the driving frequency f is changed, the scanning speed of the laser beam L on the photosensitive member 27 is changed, and the speed of conveying the sheet 3 has to be adjusted in accordance with the change.

The oscillation amplitude W of the oscillating mirror depends on the energy supplied by the driving signal S1. Namely, the oscillation amplitude W becomes larger as the supply energy becomes larger, and the oscillation amplitude W becomes smaller as the supply energy becomes smaller. The supply energy correlates with the area (the integrated value of the voltage) of the waveform of the driving signal S1 shown in FIG. 4. Assuming that, for example, the amplitude A of the driving signal S1 is 10 V, the bias voltage Bi is 15 V, and the duty ratio D of the driving signal S1 is 50%. If the bias voltage Bi is changed by a specific rate or e.g. 10%, the supply energy (the area of the waveform of the driving signal S1) is changed by 10%. By contrast, if the duty ratio D is changed by a specific rate or e.g. 10%, the supply energy is changed by 6.7%. Namely, in the case where the duty ratio D is changed, the oscillation amplitude W of the oscillating mirror 19 can be adjusted more finely than the case where the bias voltage Bi is changed.

Moreover, for the driving signal S1 having a duty ratio of 60%, if the duty ratio D is changed by a specific rate or e.g. 10%, for example, the supply energy is changed by 6.3%. By contrast, for the driving signal S1 having a duty ratio of 40%, if the duty ratio D is changed by a specific rate or 10%, for example, the supply energy is changed by 7.1%. That is, in the case of the driving signal S1 of a waveform (high duty) in which the time of a high level $T_{high}$ (the voltage level when an energy (electrostatic force) is given to the oscillating mirror 19) is longer than that of a low level $T_{low}$, namely, the fluctuation amount of the driving signal S1 with respect to a unit change amount of the duty ratio D is smaller than the case of a driving signal of a waveform (low duty) in which the time of the high level $T_{high}$ is shorter than the time of the low level $T_{low}$. If the duty ratio D of the high-duty driving signal S1 is changed, therefore, the oscillation amplitude W of the oscillating mirror 19 can be adjusted more finely than the case where the driving signal S1 has a low duty. The above agrees with results of experiments which have been actually conducted.

In this exemplary embodiment, the CPU 77 selectively executes a first adjusting operation and a second adjusting operation in the control of the oscillating mirror. The first adjusting operation includes an operation of changing the duty ratio D. And, the first adjusting operation is executed to perform fine adjustment when the difference between the oscillation amplitude W of the oscillating mirror 19 and the target value is relatively small. The second adjusting operation is an operation of changing the bias voltage Bi. And, the second adjusting operation is executed to perform coarse adjustment when the difference between the oscillation amplitude W of the oscillating mirror 19 and the target value is relatively large. In the first adjusting operation, the driving signal S1 is set to have a high duty, and the duty ratio D is changed under the high duty.

Figure 6:
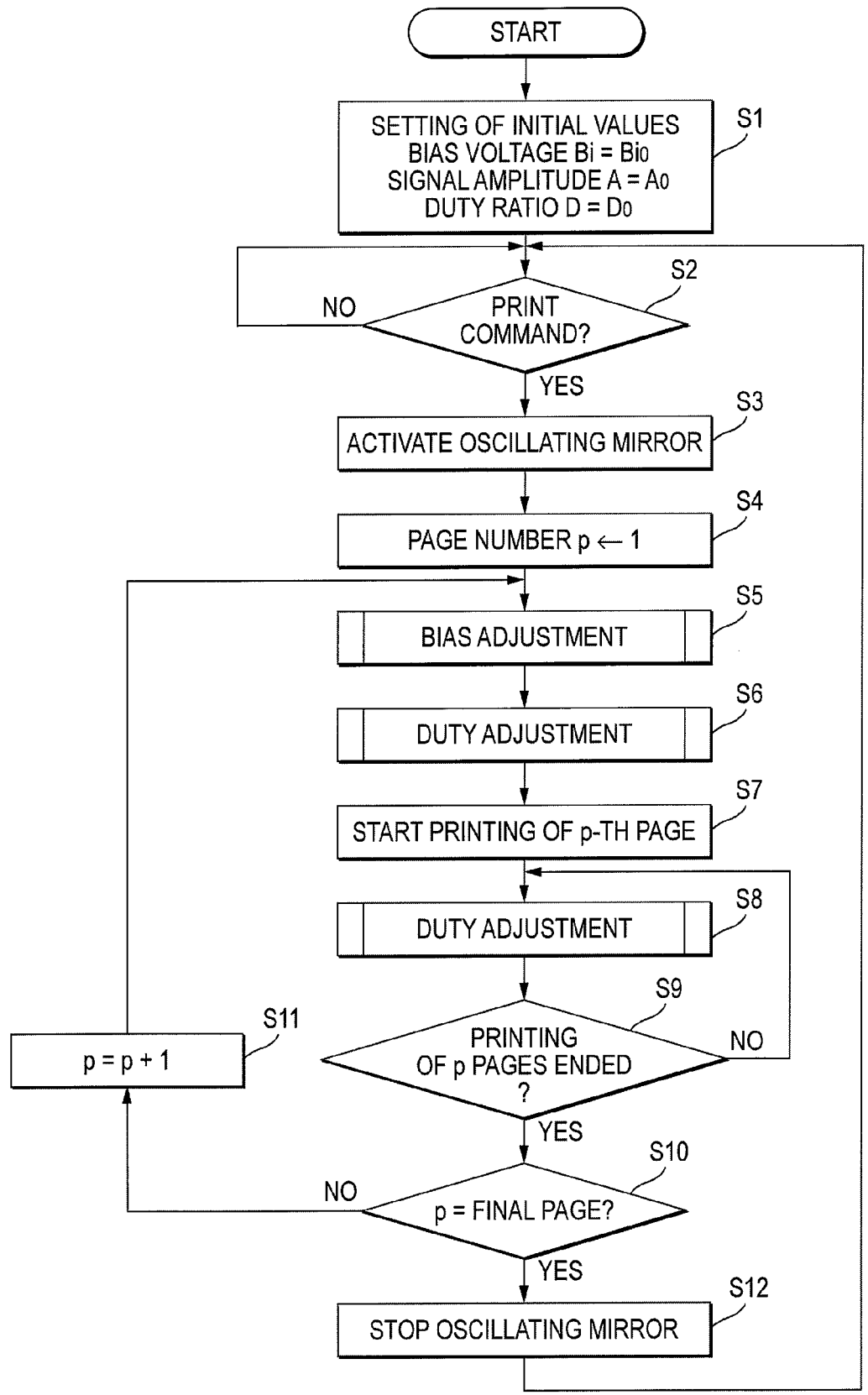
FIG. 6 is a flowchart of a main process of the control of the oscillating mirror according to an exemplary embodiment of the present invention.
Figure 7:
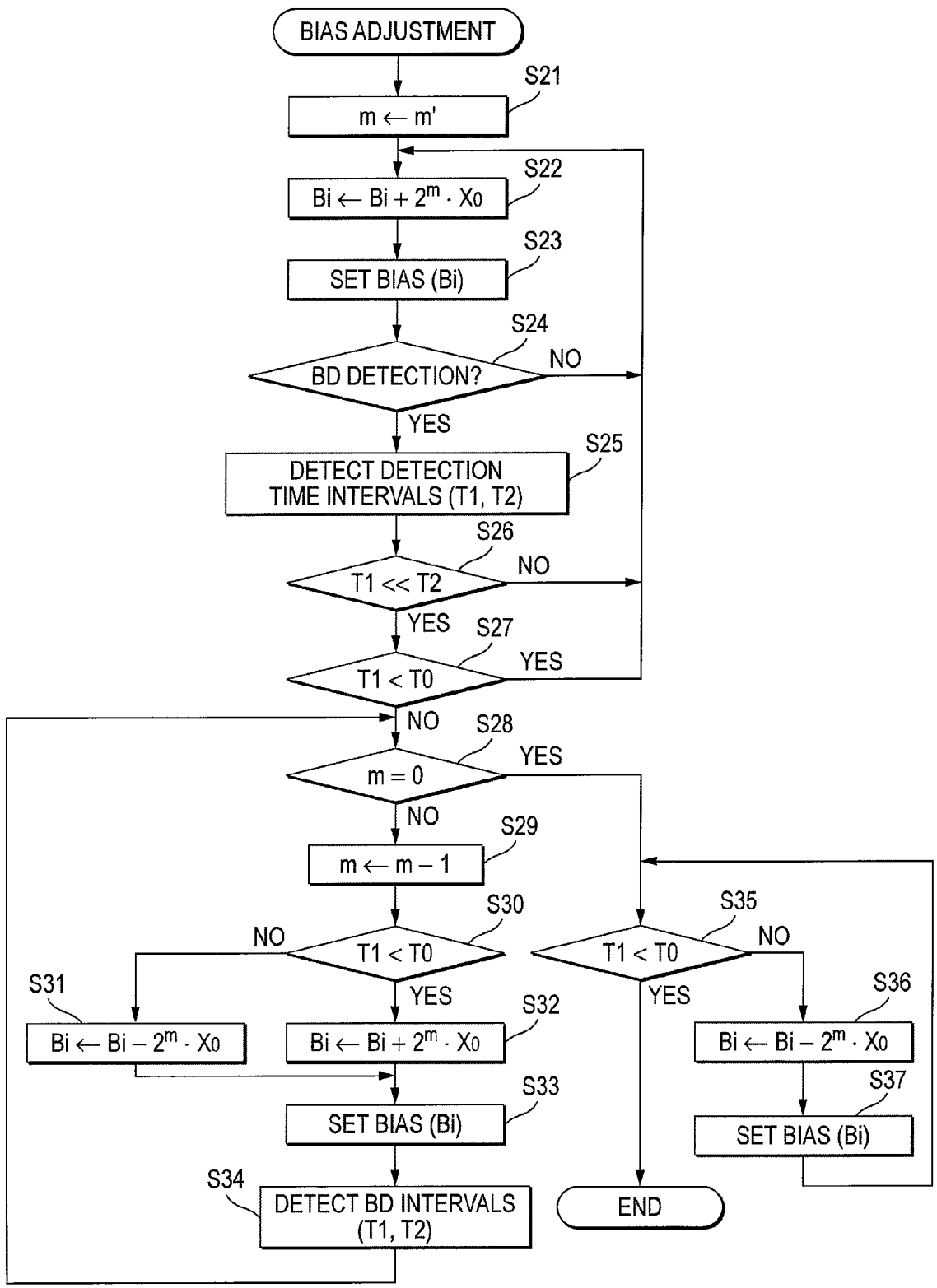
FIG. 7 is a flowchart of a bias adjusting process according to an exemplary embodiment of the present invention.
Figure 8:
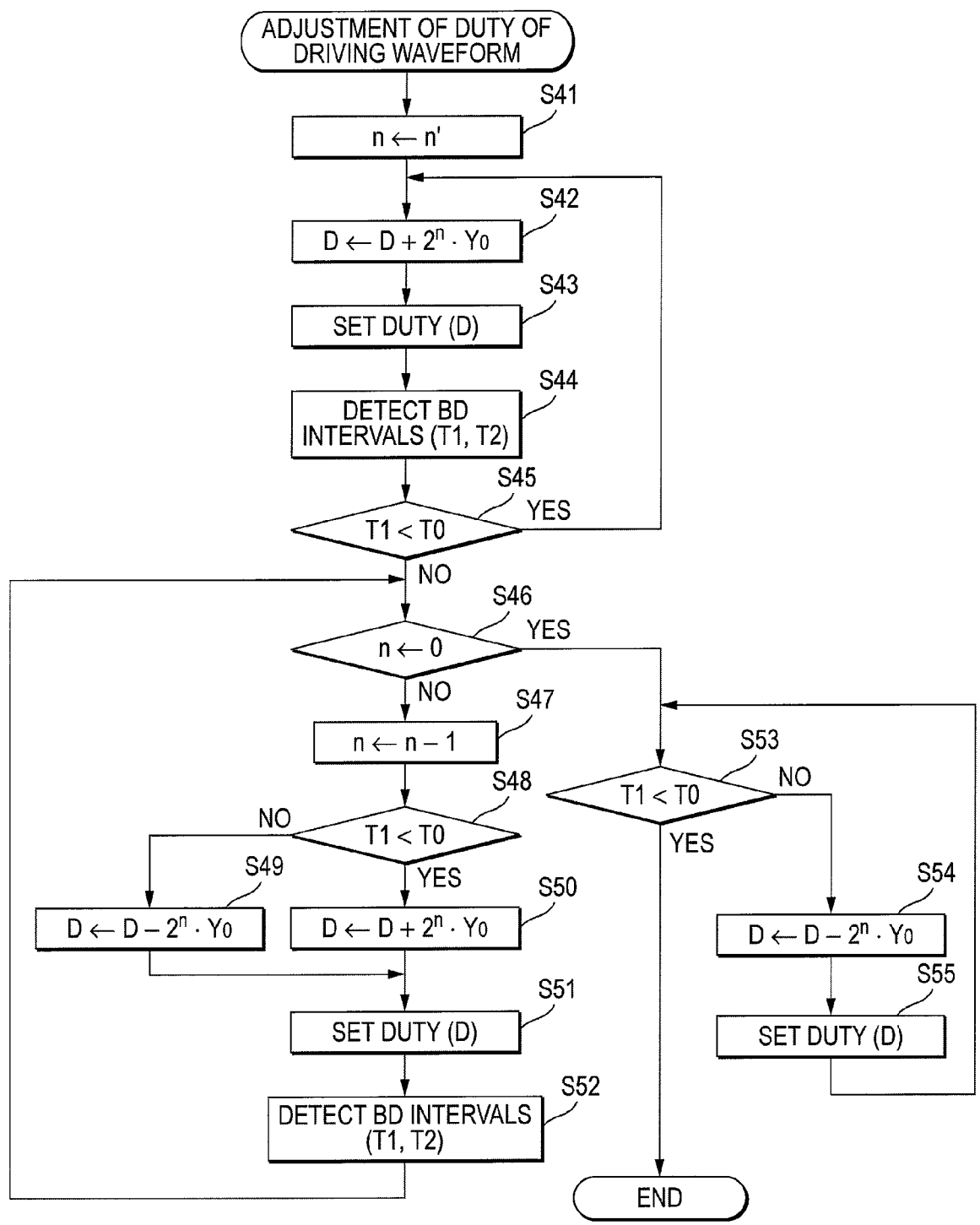
FIG. 8 is a flowchart of a duty adjusting process according to an exemplary embodiment of the present invention.

Specifically, the CPU 77 executes the processes shown in FIGS. 6 to 8 to control the duty controlling circuit 72, the amplitude controlling circuit 74, the bias controlling circuit 76, the LD driving circuit 79, and the BD detecting circuit 80.

When the laser printer is powered on, the CPU 77 reads out in S1 initial values (Bio, Ao, Do) of the bias voltage Bi, the signal amplitude A, and the duty ratio D from the memory 78, and sets the values to the controlling circuits 72, 74, 76, respectively. When a print command is issued by, for example, the user (S2:Y), the driving circuit 70 is activated in S3, and a page-number counter P is initialized in S4 to 1.

(1) Second Adjusting Operation

Immediately after activation of the scanner unit 16 (driving circuit 70), the oscillating mirror 19 has not yet sufficiently oscillated, and the difference between the oscillation amplitude W and the target value is relatively large. Therefore, the CPU 77 performs in S5 a bias adjusting process shown in FIG. 7 to execute the second adjusting operation. In S21, a given initial value m' (in this exemplary embodiment, for example, 2) is set as an adjustment value m, which is an integer of 1 or more, and the bias voltage Bi is increased in S22 and S23 through the bias controlling circuit 76. The increment of this increase is a value of ($2^m \cdot Xo$) corresponding to the minimum change amount Xo (resolution) of the D/A converter 82.

Figure 9:
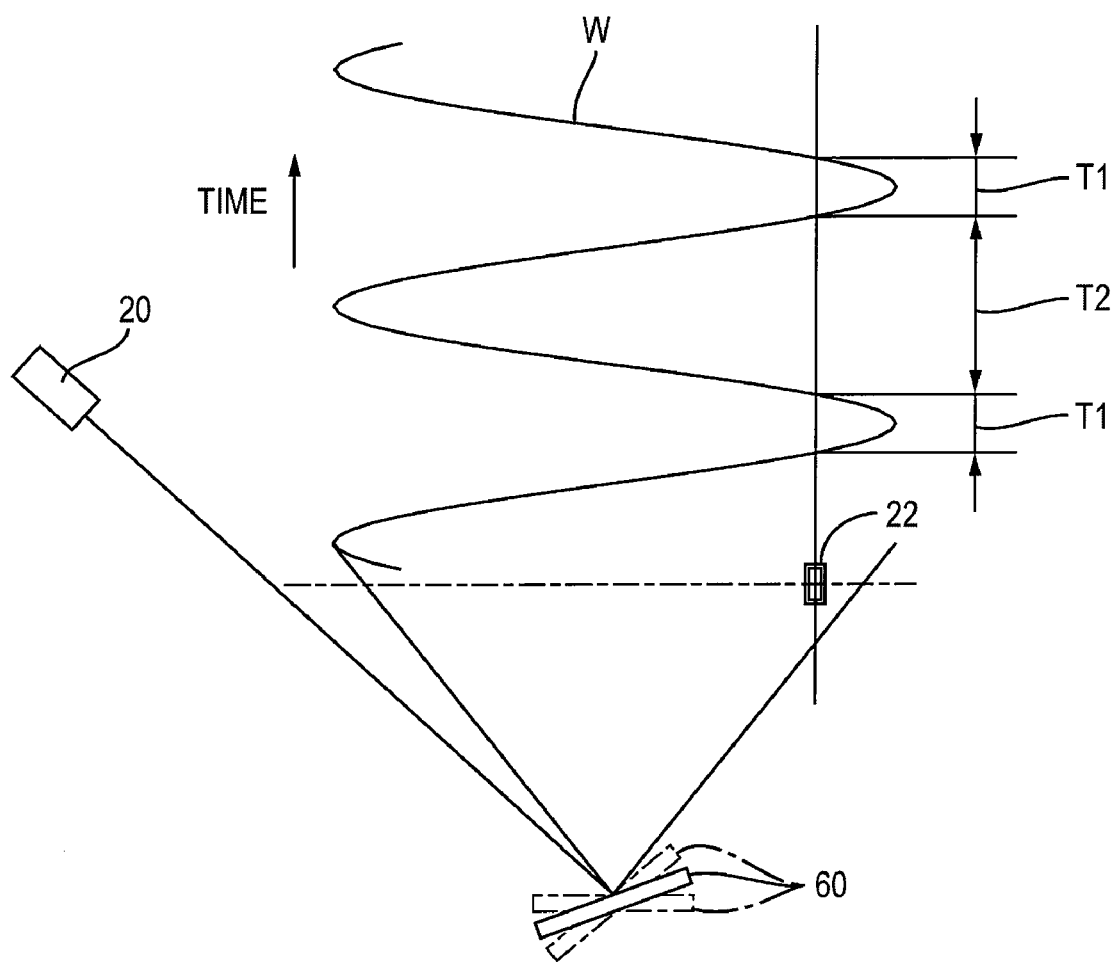
FIG. 9 is a diagram showing a detection time interval of a laser beam in a BD sensor according to an exemplary embodiment of the present invention.

In S24, the laser beam L is detected through the BD sensor 22. When the oscillation amplitude W of the oscillating mirror 19 is small, the laser beam L is not detected by the BD sensor 22 (S24: No). In this case, the process returns to S22 and S23 and the bias voltage Bi is increased. After the oscillation amplitude W of the oscillating mirror 19 is increased to some extent, the BD sensor 22 first detects one time the laser beam L in a one-period oscillation of the oscillating mirror 19. If the BD sensor 22 detects the laser beam L (S24: Yes), a first detection time interval T1 and second detection time interval T2 which are adjacent to each other are detected. And in S26, it is determined whether the first detection time interval T1 is much smaller than the second detection time interval T2 (smaller by a given value). At first, the first detection time interval T1 and the second detection time interval T2 are substantially equal to each other (S26: N), and therefore the process returns to S22. When the bias voltage Bi is thereafter further increased (S22, S23) and the oscillation amplitude W of the oscillating mirror 19 is further increased, the BD sensor 22 detects two times the laser beam L in a one-period oscillation of the oscillating mirror 19 as shown in FIG. 9 (S24: Yes). At this time, as the detection time interval of the laser beam L, the first detection time interval T1 and the second detection time interval T2 are alternately repeated. In the exemplary embodiment, the shorter detection time interval is specified in S26 as the first detection time interval T1. If it is determined that the first detection time interval T1 is much smaller than the second detection time interval T2 (S26: Yes), the process proceeds to S27. In S27, the first detection time interval T1 and the reference time T0 are compared with each other.

If the first detection time interval T1 is equal to or longer than the reference time T0 (S27: No), it is determined in S28 whether the adjustment value m is zero. Initially, m is set to 2 (S28: No), then the process proceeds to S29 and the adjustment value m is decreased by 1 in S29. Namely, the increment or decrement ($2^m \cdot Xo$) of the bias voltage Bi is decreased as compared with S22. Next, it is determined whether the first detection time interval T1 is equal to or longer than the reference time T0 in S30. If the first detection time interval T1 is equal to or longer than the reference time T0 (S30: No), the bias voltage Bi is lowered by $2^m \cdot Xo$ in S31. If the first detection time interval T1 is shorter than the reference time T0 (S30: Yes), the bias voltage Bi is raised by $2^m \cdot Xo$ in S32. And the lowered or raised bias voltage Bi is set in S33. Then, the detection time intervals T1, T2 of the laser beam L are again detected in S34.

If the process of S29 to S34 is performed until the adjustment value m becomes zero (S28: Yes), it is determined whether the first detection time interval T1 is shorter than the reference time T0. If the first detection time interval T1 is equal to or longer than the reference time T0 (S35: No), the bias voltage Bi is lowered by $2^m \cdot Xo$ in S36 and S37. Therefore, the first detection time interval T1 is set to the same value as the reference time T0, or a value which is slightly smaller than the reference time T0, and then the bias adjusting process ends. The difference between the oscillation amplitude W of the oscillating mirror 19 and the target value at this time is an example of a predetermined value.

(2) First Adjusting Operation

When the bias adjusting process (second adjusting operation) in S6 ends, the oscillating mirror 19 has sufficiently oscillated, and the difference between the oscillation amplitude W and the target value becomes relatively small. During the printing process which is executed thereafter by the printing unit 5, the oscillation amplitude W of the oscillating mirror 19 has to be adjusted with a high accuracy so as not to influence the print quality. Therefore, the CPU 77 performs in S6 a duty adjusting process shown in FIG. 8 to execute the first adjusting operation.

In S41, first, a given initial value n' (in this exemplary embodiment, for example, 2) is set as an adjustment value n, which is an integer of 1 or more. Then, the duty ratio D of the driving signal S1 is increased in S42 and S43 through the duty controlling circuit 72. The increment of this increase is a value of ($2^n \cdot Yo$) corresponding to the minimum change amount Yo (resolution) of the duty controlling circuit 72.

The clock generator 71 produces the driving signal S1 by using the clock signal which is originally used in a control system of the printer. The clock signal which is required in the control system has a frequency of several tens MHz. By contrast, the oscillation frequency which is required in the oscillating mirror 19 is about 3 kHz in the case of a printer in which the print density is 600 dpi and the printing speed is 20 ppm. On the other hand, for example, the resolution of the D/A converter 82 is 10 bit, that is, 1,024. Therefore, the duty ratio D can be changed at a resolution which is higher than that of the bias voltage Bi. In S44, the laser beam L is detected through the BD sensor 22, and, in S45, the first detection time interval T1, which is the shorter interval, is compared with the reference time T0. If the first detection time interval T1 is equal to or longer than the reference time T0 (S45: No), it is determined in S46 whether or not the adjustment value n is zero. Initially, n is set to 2 (S46: No), and therefore the adjustment value n is decreased by 1 in S47. Namely, the increment or decrement ($2^n \cdot Yo$) of the duty ratio D is decreased as compared with S42. Next, it is determined whether the first detection time interval T1 is shorter than the reference time T0 in S48. If the first detection time interval T1 is equal to or longer than the reference time T0 (S48: No), the duty ratio D is decreased by $2^n \cdot Yo$ in S49. If the first detection time interval T1 is shorter than the reference time T0 (S48: Yes), the duty ratio D is increased by $2^n \cdot Yo$ in S50. And the decreased or increased duty ratio D is set in S33. Then, the detection time intervals T1, T2 of the laser beam L are again detected in S52.

If the process of S47 to S52 is performed until the adjustment value n is zero (S46: Yes), it is determined whether the first detection time interval T1 is shorter than the reference time T0. If the first detection time interval T1 is equal to or longer than the reference time T0 (S53: No), the duty ratio D is decreased by $2^n \cdot Yo$ in S54 and S55. Therefore, the first detection time interval T1 is set to the same value as the reference time T0, or a value which is slightly smaller than the reference time T0, and then the duty adjusting process ends.

Then, in step S7 of FIG. 6, the CPU 77 controls the printing unit 5 so as to start the printing of a p-th page. In the printing unit 5, therefore, the registration roller 12 sends the sheet 3 to the transferring position. Along with sending the sheet 3, the scanner unit 16 starts the exposure on the photosensitive drum 27. During the period from the start to the end of the printing of an image of the p-th page, the oscillation amplitude W of the oscillating mirror 19 is finely adjusted by the duty adjusting process as explained above (S8).

In S9, it is determined whether the printing of the p-th page ends. When the printing of the p-th page ends (S9: Yes), it is determined whether p-th page is the final page of the current print job in S1. If the p-th page is not the final page of the current print job (S10: No), the page-number counter is incremented by 1 in S11, and the process returns to S5. By contrast, if the p-th page is the final page (S10: Yes), namely, if the printing process for one print job ends, the oscillating mirror 19 is stopped in S12, and the CPU 77 again enters the state of waiting the print command. It is noted that information of the page number in a print job is obtained from header information included in print data.

(Function and Effect of this Exemplary Embodiment)

In the case where the printing region E is to be set only in a predetermined range on the photosensitive drum 27, if the oscillation amplitude W of the oscillating mirror 19 is small, the optical path length between the oscillating mirror 19 and the photosensitive drum 27 has to be correspondingly prolonged, and there arises a possibility that the size of the laser printer 1 is accordingly enlarged. Therefore, the oscillation amplitude W of the oscillating mirror 19 has to be widened as long as possible. Consequently, the driving frequency (a frequency corresponding to the driving frequency f of the driving signal S1) of the oscillating mirror 19 due to the driving signal S1 is set in the vicinity of the resonance frequency (a specific frequency determined by the structure, material, and the like of the oscillating mirror 19) of the oscillating mirror 19, thereby using the resonance phenomenon.

In the case where the driving frequency of the oscillating mirror 19 is set in the vicinity of the resonance frequency in this way, even when the voltage level of the driving frequency S1 is slightly changed, the oscillation amplitude W of the oscillating mirror 19 largely fluctuates. Therefore, during the period when the printing unit 5 performs the printing process, particularly, the driving signal S1 has to be finely adjusted. In this exemplary embodiment, during the printing process, therefore, the voltage level of the driving frequency S1 is finely adjusted by changing the duty ratio D (the first adjusting operation). As a result, the fluctuation of the oscillation amplitude W of the oscillating mirror 19 can be suppressed and a high print quality can be maintained.

If the scanner unit 16 is configured so that the first adjusting operation is performed from the start of the activation thereof, there may arise a case where the adjustment allowable range becomes narrow and the adjustment cannot be sufficiently performed. Moreover, even when the adjustment is enabled, it may take a long time before the oscillation amplitude W of the oscillating mirror 19 approaches the target value. In this exemplary embodiment, at the start of the activation of the scanner unit 16, therefore, the voltage level of the driving frequency S1 is coarsely adjusted by changing the bias voltage Bi (the second adjusting operation). In the second adjusting operation, the unit increment and decrement are larger than those in the first adjusting operation, and hence the oscillation amplitude W of the oscillating mirror 19 can approach the target value, early.

In the first adjusting operation, the driving signal S1 is set to a high-duty state in which the time of the high level $T_{high}$ is longer than that of the low level $T_{low}$, and the duty ratio D is changed under the high-duty state. Therefore, the voltage level of the driving frequency S1 can be adjusted more finely than the case where the driving signal S1 is set to a low-duty state. In the adjustment in which the duty ratio is decreased, the adjustment tends to be performed more roughly than that in which the duty ratio is increased. In this exemplary embodiment, after the first detection time interval T1 is adjusted in S27 to a value which is smaller than the reference time T0, the CPU 77 ends the second adjusting operation, and transfers to the first adjusting operation. Namely, the duty ratio is increased in the first adjusting operation. Therefore, the duty adjustment can be performed more finely.

Other Exemplary Embodiments

While the present invention has been shown and described with reference to certain exemplary embodiments thereof, it will be understood by those skilled in the art that various changes in form and details may be made therein without departing from the spirit and scope of the invention as defined by the appended claims. For example, also the following exemplary embodiments fall within the technical scope of the invention.

(1) "Optical scanning device" may be installed on a display apparatus, projector, and scanner (image reading apparatus) which are of the laser scan type, and the like, in place of the scanner unit 16 which is used for the laser printer 1 as in the above-described exemplary embodiment.

(2) "Driving signal" may have a trapezoidal waveform in place of a rectangular waveform.

(3) Unlike the above-described exemplary embodiment, the movable electrode 61 may be grounded, and the pulse-like driving signal S1 may be given to the stationary electrode 62. Alternatively, a pulse-like driving signal may be given to both the movable electrode 61 and the stationary electrode 62.

(4) The amplitude A of the driving signal S1 may be changed by the fine adjustment (the first adjusting operation). Experimental results show that, as compared with the case of the changing of the bias voltage Bi, the oscillation amplitude W of the oscillating mirror can be adjusted more finely by changing the signal amplitude A.

(5) A configuration may be employed in which, in the first adjusting operation, an average of plural first detection time intervals T1 is compared with the reference time T0 in, for example, S45, S48, and S53. Alternatively, after an elapse of a predetermined time from the changing of the duty ratio D, the first detection time interval T1 may be detected, and the detected time interval may be compared with the reference time T0. This configuration is advantageous since it takes a long time for the oscillation amplitude W of the oscillating mirror 19 to stabilize after the duty ratio D is changed.

The present invention provides illustrative, non-limiting embodiments as follows:

(1) An optical scanning device comprises: an oscillating mirror which has a pair of electrodes and a mirror oscillator, and which deflects a light beam; a driving unit which applies a wave-like driving signal to the pair of electrodes so as to oscillate the mirror oscillator by an electrostatic force corresponding to the driving signal; and an adjusting unit which changes a duty ratio of the driving signal to adjust an oscillation amplitude of the oscillating mirror.

According to the above configuration, the oscillation amplitude of the oscillating mirror can be more finely adjusted as compared with the case where the amplitude of an oscillating mirror is adjusted by using the amplification factor.

(2) The optical scanning device according to (1), the driving signal may have a waveform in which a high-level time is longer than a low-level time.

According to the above configuration, the device is configured so that the duty ratio of a high-duty driving signal is changed, whereby the oscillation amplitude of the oscillating mirror can be more finely adjusted as compared with the case where the driving signal is a low-duty signal.

(3) The optical scanning device according to (1) or (2), the adjusting unit may be configured to perform a first adjusting operation of changing the duty ratio of the driving signal, and a second adjusting operation of changing a bias voltage of the driving signal.

According to the above configuration, the first adjusting operation can be performed in a fine adjustment of the amplitude of the oscillating mirror, and the second adjusting operation can be performed in a coarse adjustment.

(4) The optical scanning device according to (3), may further comprise a detecting unit which detects the oscillation amplitude of the oscillating mirror. The adjusting unit may be configured to adjust the oscillation amplitude of the oscillating mirror to reach a target value, on the basis of a result of the detection by the detecting unit. The adjusting unit may be configured to perform the second adjusting operation until a difference between the oscillation amplitude of the oscillating mirror and the target value is zero or smaller than a threshold value, and perform the first adjusting operation after performing the second adjusting operation.

According to the above configuration, in the case where the difference between the oscillation amplitude of the oscillating mirror and the target value is relatively large, the coarse adjustment is performed by the second adjusting operation in which the bias voltage is changed, and, in the case where the difference is relatively small, the fine adjustment is performed by the first adjusting operation in which the duty ratio is changed. Therefore, an adequate adjustment can be performed in accordance with the difference.

(5) The optical scanning device according to (4), the detecting unit may include an optical sensor which is disposed at a given position and may detect time intervals of detecting a light beam deflected by the oscillating mirror.

(6) The optical scanning device according to (1) to (5), the mirror oscillator may have a resonance frequency which is substantially same as a frequency of the driving signal.

(7) A printing apparatus comprises: an optical scanning device including: an oscillating mirror which has a pair of electrodes and a mirror oscillator, and which deflects a light beam; a driving unit which applies a wave-like driving signal to the pair of electrodes so as to oscillate the mirror oscillator by an electrostatic force corresponding to the driving signal; and an adjusting unit which changes a duty ratio of the driving signal to adjust an oscillation amplitude of the oscillating mirror; and a printing unit including a photosensitive member to be irradiated with light beam deflected by the optical scanning device, the printing unit configured to perform a printing process of transferring an image formed on the photosensitive member to a recording medium.

(8) The printing apparatus according to (7), the adjusting unit may be configured to perform a first adjusting operation of changing the duty ratio of the driving signal, and a second adjusting operation of changing a bias voltage of the driving signal. During a period when the printing unit performs the printing process on the recording medium, the adjusting unit of the optical scanning device may perform the first adjusting operation.

According to the above configuration, during the period when the printing unit performs the printing process, although the oscillation amplitude of the oscillating mirror is stabilized in the vicinity of the target value as compared with immediately after activation of the optical scanning device, the oscillation amplitude of the oscillating mirror must be adjusted with a high accuracy so as not to influence the print quality. Therefore, preferably, the oscillation amplitude of the oscillating mirror is adjusted by the first adjusting operation in which the duty ratio is changed.

(9) A method for adjusting an oscillation amplitude of an oscillating mirror which includes a pair of electrodes and a mirror oscillator, and which deflects a light beam, the method comprising: adjusting the amplitude of the oscillating mirror by changing a duty ratio of a driving signal which is applied to the pair of electrodes of the oscillating mirror.

What is claimed is:

1. An optical scanning device comprising:
    an oscillating mirror which has a pair of electrodes and a mirror oscillator, and which deflects a light beam;
    a driving unit which applies a wave-like driving signal to the pair of electrodes so as to oscillate the mirror oscillator by an electrostatic force corresponding to the driving signal; and
    an adjusting unit which changes a duty ratio of the driving signal to adjust an oscillation amplitude of the oscillating mirror.

2. The optical scanning device according to claim 1,
    wherein the driving signal has a waveform in which a high-level time is longer than a low-level time.

3. The optical scanning device according to claim 1,
    wherein the adjusting unit is configured to perform a first adjusting operation of changing the duty ratio of the driving signal, and a second adjusting operation of changing a bias voltage of the driving signal.

4. The optical scanning device according to claim 3, further comprising a detecting unit which detects the oscillation amplitude of the oscillating mirror,
    wherein the adjusting unit is configured to adjust the oscillation amplitude of the oscillating mirror to reach a target value, on the basis of a result of the detection by the detecting unit, and
    wherein the adjusting unit is configured to perform the second adjusting operation until a difference between the oscillation amplitude of the oscillating mirror and the target value is zero or smaller than a threshold value, and perform the first adjusting operation after performing the second adjusting operation.

5. The optical scanning device according to claim 4,
    wherein the detecting unit includes an optical sensor which is disposed at a given position and detects time intervals of detecting a light beam deflected by the oscillating mirror.

6. The optical scanning device according to claim 1,
    wherein the mirror oscillator has a resonance frequency which is substantially same as a frequency of the driving signal.

7. A printing apparatus comprising:
    an optical scanning device including:
        an oscillating mirror which has a pair of electrodes and a mirror oscillator, and which deflects a light beam;
        a driving unit which applies a wave-like driving signal to the pair of electrodes so as to oscillate the mirror oscillator by an electrostatic force corresponding to the driving signal; and
        an adjusting unit which changes a duty ratio of the driving signal to adjust an oscillation amplitude of the oscillating mirror; and
    a printing unit including a photosensitive member to be irradiated with light beam deflected by the optical scanning device, the printing unit configured to perform a printing process of transferring an image formed on the photosensitive member to a recording medium.

8. The printing apparatus according to claim 7,
    wherein the adjusting unit is configured to perform a first adjusting operation of changing the duty ratio of the driving signal, and a second adjusting operation of changing a bias voltage of the driving signal, and
    wherein during a period when the printing unit performs the printing process on the recording medium, the adjusting unit of the optical scanning device performs the first adjusting operation.

9. A method for adjusting an oscillation amplitude of an oscillating mirror which includes a pair of electrodes and a mirror oscillator, and which deflects a light beam, the method comprising:
    adjusting the amplitude of the oscillating mirror by changing a duty ratio of a driving signal which is applied to the pair of electrodes of the oscillating mirror.

* * * * *